United States Patent
Muramatsu

(10) Patent No.: US 9,294,685 B2
(45) Date of Patent: Mar. 22, 2016

(54) IMAGE PROCESSING APPARATUS, ELECTRONIC CAMERA, AND MEDIUM STORING IMAGE PROCESSING PROGRAM

(75) Inventor: Masaru Muramatsu, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 69 days.

(21) Appl. No.: 13/177,930

(22) Filed: Jul. 7, 2011

(65) Prior Publication Data

US 2012/0008006 A1 Jan. 12, 2012

(30) Foreign Application Priority Data

Jul. 8, 2010 (JP) ................................ 2010-155791

(51) Int. Cl.
| | |
|---|---|
| H04N 5/235 | (2006.01) |
| H04N 5/202 | (2006.01) |
| G06T 5/00 | (2006.01) |
| H04N 1/387 | (2006.01) |
| H04N 1/407 | (2006.01) |

(52) U.S. Cl.
CPC .............. *H04N 5/2355* (2013.01); *G06T 5/009* (2013.01); *H04N 1/3871* (2013.01); *H04N 1/407* (2013.01); *H04N 5/202* (2013.01); *G06T 2207/10144* (2013.01); *G06T 2207/20208* (2013.01); *G06T 2207/20212* (2013.01)

(58) Field of Classification Search
None
See application file for complete search history.

(56) References Cited

U.S. PATENT DOCUMENTS

| 5,455,621 A | 10/1995 | Morimura |
| 5,517,242 A | 5/1996 | Yamada et al. |
| 5,828,793 A * | 10/1998 | Mann ....................... G06T 5/007 348/222.1 |
| 6,040,858 A * | 3/2000 | Ikeda ..................... H04N 5/235 348/242 |
| 6,813,046 B1 * | 11/2004 | Gindele .................. H04N 5/235 250/208.1 |
| 6,909,461 B1 * | 6/2005 | Gallagher .............. H04N 9/045 250/214 R |
| 7,088,390 B2 * | 8/2006 | Mori et al. ..................... 348/254 |
| 7,663,677 B2 * | 2/2010 | Shiraishi ....................... 348/254 |
| 7,843,498 B2 * | 11/2010 | Takahashi ............ H04N 1/4092 348/222.1 |
| 7,880,771 B2 * | 2/2011 | Toyoda ..................... 348/222.1 |

(Continued)

FOREIGN PATENT DOCUMENTS

| JP | A-07-75026 | 3/1995 |
| JP | B2-3074967 | 6/2000 |

(Continued)

OTHER PUBLICATIONS

Jul. 2, 2013 Notification of Reasons for Refusal issued in Japanese Patent Application No. 2012-148477 (with translation).

(Continued)

*Primary Examiner* — Michael Osinski
(74) *Attorney, Agent, or Firm* — Oliff PLC

(57) ABSTRACT

In an image processing apparatus performing synthetic processing on N number of images (where N is an integer of two or larger) being captured from a same photographic scene under mutually different exposure conditions to generate a synthetic image with a higher dynamic range than the N number of images, obtaining the N number of images, and performing low-pass processing on at least one image among the N number of images to generate a low-pass image. Then, a weighting amount in the synthetic processing is decided based on the low-pass image, and the synthetic processing is performed on the N number of images according to the decided weighting amount to generate the synthetic image. Accordingly, a natural synthetic image with fewer changes in contrast, hue, and chroma is generated in a simple configuration when generating the synthetic image.

10 Claims, 15 Drawing Sheets

(56) References Cited

U.S. PATENT DOCUMENTS

| | | | |
|---|---|---|---|
| 7,949,201 B2* | 5/2011 | Suzuki | 382/274 |
| 8,339,475 B2* | 12/2012 | Atanassov | G06T 5/007 |
| | | | 348/229.1 |
| 8,462,221 B2* | 6/2013 | Morales | G06T 5/50 |
| | | | 348/221.1 |
| 8,989,510 B2* | 3/2015 | Muramatsu | 382/255 |
| 2002/0145667 A1* | 10/2002 | Horiuchi | 348/207.99 |
| 2004/0070778 A1* | 4/2004 | Matama | 358/1.9 |
| 2004/0179111 A1* | 9/2004 | Hattori | 348/222.1 |
| 2004/0207734 A1* | 10/2004 | Horiuchi | 348/229.1 |
| 2005/0134711 A1* | 6/2005 | Hori | 348/254 |
| 2005/0185071 A1* | 8/2005 | Takahashi | H04N 5/21 |
| | | | 348/254 |
| 2005/0185223 A1* | 8/2005 | Takahashi et al. | 358/3.26 |
| 2006/0033823 A1* | 2/2006 | Okamura | 348/254 |
| 2006/0062558 A1* | 3/2006 | Kato et al. | 396/72 |
| 2007/0047033 A1* | 3/2007 | Furui | 358/519 |
| 2007/0146538 A1* | 6/2007 | Kakinuma et al. | 348/362 |
| 2007/0292048 A1* | 12/2007 | Choe et al. | 382/286 |
| 2008/0187235 A1 | 8/2008 | Wakazono et al. | |
| 2008/0219585 A1* | 9/2008 | Kasai et al. | 382/274 |
| 2008/0253758 A1* | 10/2008 | Yap et al. | 396/234 |
| 2009/0040337 A1* | 2/2009 | Vitsnudel et al. | 348/229.1 |
| 2009/0041350 A1* | 2/2009 | Utagawa et al. | 382/169 |
| 2010/0026825 A1* | 2/2010 | Doida | G06T 3/40 |
| | | | 348/222.1 |
| 2010/0128332 A1* | 5/2010 | Wakazono et al. | 358/521 |
| 2010/0177215 A1* | 7/2010 | Kita | 348/234 |
| 2011/0128404 A1* | 6/2011 | Muramatsu | 348/222.1 |
| 2011/0149111 A1* | 6/2011 | Prentice | H04N 5/23216 |
| | | | 348/229.1 |
| 2012/0105673 A1* | 5/2012 | Morales | H04N 5/2355 |
| | | | 348/229.1 |
| 2012/0218442 A1* | 8/2012 | Jandhyala | G06T 7/20 |
| | | | 348/239 |

FOREIGN PATENT DOCUMENTS

| | | |
|---|---|---|
| JP | A-2003-158669 | 5/2003 |
| JP | A-2008-104010 | 5/2008 |

OTHER PUBLICATIONS

May 1, 2012 Notification of Reasons for Refusal issued in Japanese Patent Application No. 2010-155791 (with translation).

Jul. 3, 2015 Office Action issued in Chinese Patent Application No. 201110196067.3.

* cited by examiner

IMAGE PROCESSING APPARATUS, ELECTRONIC CAMERA, AND MEDIUM STORING IMAGE PROCESSING PROGRAM

CROSS-REFERENCE TO RELATED APPLICATION

This application is based upon and claims the benefit of priority from Japanese Patent Application No. 2010-155791, filed on Jul. 8, 2010, the entire contents of which are incorporated herein by reference.

BACKGROUND

1. Field

The present application relates to an image processing apparatus, an electronic camera, and a medium storing an image processing program.

2. Description of the Related Art

Conventionally, there has been known an approach to synthesize a plurality of images captured from the same photographic scene under mutually different exposure conditions to generate an image with a higher dynamic range than the original image. For example, in the invention of Japanese Patent No. 3074967, different gradation curves are used according to the level of an input signal, and a first image and a second image are synthesized to thereby generate an image with a high dynamic range.

However, in the invention of Japanese Patent No. 3074967, the inclination of a gradation curve becomes gentle from an intermediate gradation to a highlight, and the contrast of a highlight portion of a synthetic image may become low. Further, a change in color tone may result in a decrease in chroma or a change in hue.

SUMMARY

Accordingly, a proposition of the present embodiment is to generate a natural synthetic image with fewer changes in contrast, hue, and chroma in a simple configuration when generating a synthetic image with a higher dynamic range than the original image from a plurality of images captured from the same photographic scene under mutually different exposure conditions.

An image processing apparatus according to one aspect, which performs synthetic processing on N number of images (where N is an integer of two or larger) being captured from a same photographic scene under mutually different exposure conditions to generate a synthetic image with a higher dynamic range than the N number of images, includes an obtaining unit obtaining the N number of images, a low-pass processing unit performing low-pass processing on at least one image among the N number of images to generate a low-pass image, a decision unit deciding a weighting amount in the synthetic processing based on the low-pass image, and an image synthesizing unit performing the synthetic processing on the N number of images according to the weighting amount to generate the synthetic image.

In addition, the low-pass processing unit may generate the low-pass image from an image with a smaller exposure amount under the exposure condition among the N number of images.

Further, the image processing apparatus may further include a gradation conversion processing unit performing predetermined gradation conversion processing on the low-pass image, in which the decision unit may decide the weighting amount based on the low-pass image being performed the gradation conversion processing.

Further, the image processing apparatus may further include a setting unit setting a gradation conversion characteristic in the gradation conversion processing based on a user operation.

Further, the image processing apparatus may further include a setting unit setting a gradation conversion characteristic in the gradation conversion processing based on luminance information of the N number of images.

Further, the obtaining unit may obtain three or more images as the N number of images, and may generate the synthetic image by repeating the processes being performed by the low-pass processing unit, the decision unit, and the image synthesizing unit a plurality of times.

Further, an electronic camera including an image capturing unit capturing a same photographic scene under mutually different exposure conditions to generate a plurality of number of images, and one of the above-described image processing apparatuses, in which the obtaining unit obtains the N number of images from the image capturing unit, is also effective as a specific aspect of the present embodiment.

Further, a storage medium storing an image processing program which causes a computer to perform synthetic processing on N number of images (where N is an integer of two or larger) being captured from a same photographic scene under mutually different exposure conditions to generate a synthetic image with a higher dynamic range than the N number of images is also effective as a specific aspect of the present embodiment the image processing program includes an obtaining step obtaining the N number of images, a low-pass processing step performing low-pass processing on at least one image among the N number of images to generate a low-pass image, a deciding step deciding a weighting amount in the synthetic processing based on the low-pass image, and an image synthesizing step performing the synthetic processing on the N number of images according to the weighting amount to generate the synthetic image.

DETAILED DESCRIPTION OF THE EMBODIMENTS

[First Embodiment]

Hereinafter, a first embodiment of the present invention will be described using drawings. In a first embodiment, an electronic camera including an image processing apparatus of the present invention will be described as an example.

Figure 1:
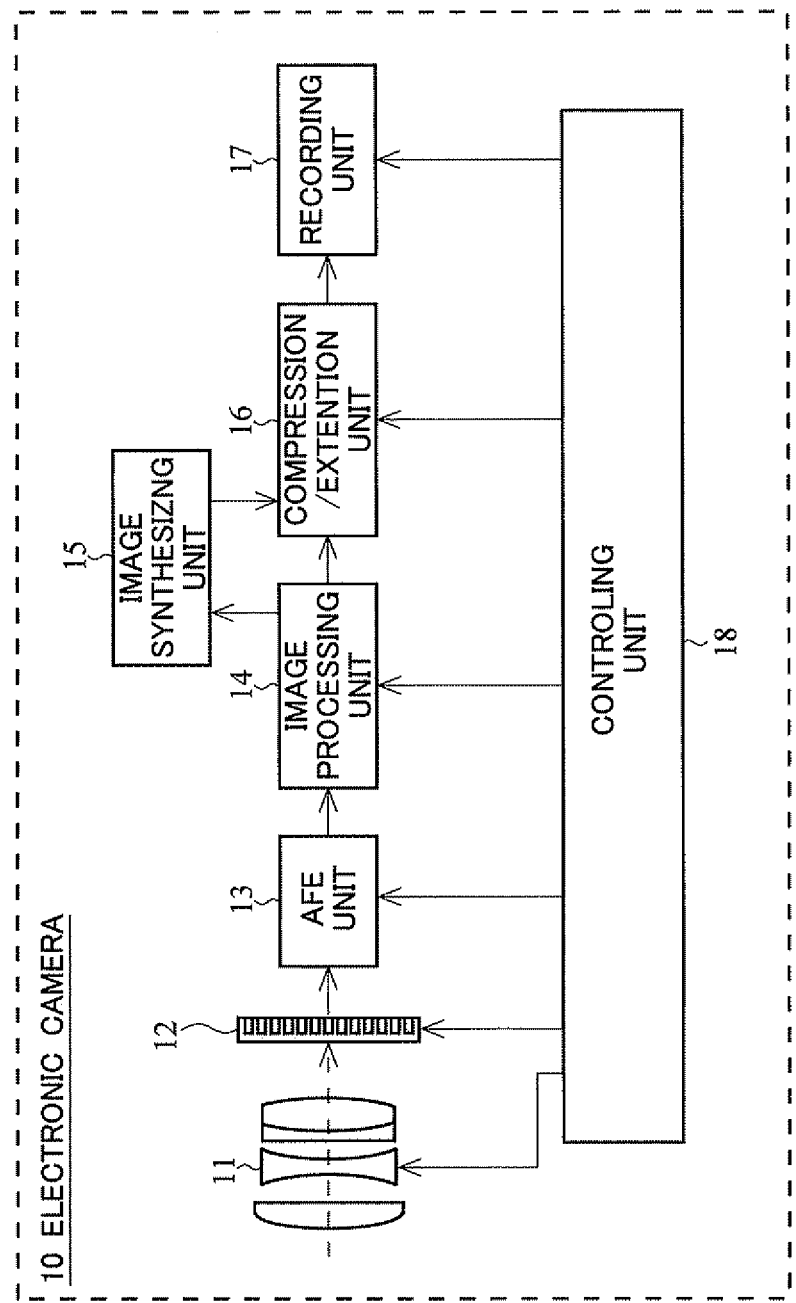
FIG. 1 is a diagram illustrating a configuration of an electronic camera 10 of a first embodiment.

FIG. 1 is a diagram illustrating a configuration of an electronic camera 10 of the first embodiment. As illustrated in FIG. 1, the electronic camera 10 includes a photographic lens 11, an image-capturing sensor 12, an analog front end unit (hereinafter referred to as AFE unit) 13, an image processing unit 14, an image synthesizing unit 15, a compression/extension unit 16, and a recording unit 17, and also includes a controlling unit 18 centrally controlling these units.

Further, the electronic camera 10 includes a not-illustrated operating unit including a display unit displaying an image generated by capturing, a release button, a setting button, and so on, which are not illustrated. The controlling unit 18 internally includes a not-illustrated memory, in which a program for controlling the aforementioned units is recorded in advance, and detects an operating state of the operating unit.

When photographing is performed, the controlling unit 18 captures a subject image through the photographic lens 11 by the image-capturing sensor 12, and generates digital image data by the AFE unit 13. Then, the controlling unit 18 performs color processing and gradation conversion processing by the image processing unit 14, and thereafter appropriately compresses the data by the compression/extension unit 16 and records the data in the recording unit 17.

Here, the electronic camera 10 has a function of high dynamic range photographing. This function is to synthesize a plurality of images captured from the same photographic scene under mutually different exposure conditions to generate an image with a higher dynamic range than the original image. The electronic camera 10 may execute this function by a user operation via the operating unit, or may execute this function based on a decision made by the controlling unit 18. Further, when this function is executed, an output of the image processing unit 14 is supplied to the image synthesizing unit 15, and an output of the image synthesizing unit 15 is coupled to the compression/extension unit 16.

When performing the high dynamic range photographing, the controlling unit 18 controls the aforementioned units to capture the same photographic scene under different exposure conditions to generate a plurality of images. The specific method of this processing is similar to publicly known techniques, and thus is omitted from the description. Setting of the exposure conditions may be performed based on a user operation via the operating unit, or may be performed through automatic control by the controlling unit 18.

Hereinafter, the description will be given on the assumption that a first image and a second image are generated by the above-described photographing. The first image is an image having a smaller exposure amount than the second image.

Figure 2:
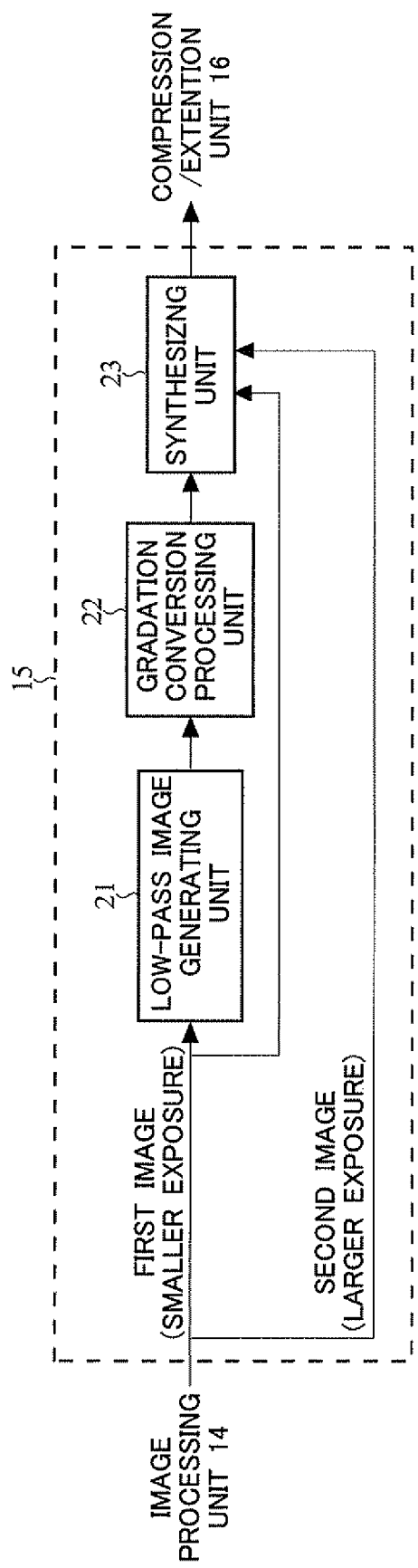
FIG. 2 is a diagram illustrating details of an image synthesizing unit 15 of the first embodiment.

FIG. 2 is a diagram illustrating details of the image synthesizing unit 15. As illustrated in FIG. 2, the image synthesizing unit 15 includes a low-pass image generating unit 21, a gradation conversion processing unit 22, and a synthesizing unit 23. Note that units performing ordinary image processing such as color processing, gradation conversion processing, and the like are omitted from the illustration and description.

Operation in the image synthesizing unit 15 described is FIG. 2 will be described using a flowchart of FIG. 3.

In step S1, the image synthesizing unit 15 obtains a first image and a second image. The first image and the second image may be images after being subjected to ordinary image processing, or images in the course of ordinary image processing. Here, RGB values of the first image are denoted by R1[x,y], G1[x,y], B1[x,y], and RGB values of the second image are denoted by R2[x,y], G2[x,y], B2[x,y].

In step S2, the image synthesizing unit 15 creates a low-pass image of the first image by the low-pass image generating unit 21. The low-pass image generating unit 21 obtains a luminance value Y1[x,y] using the following equation based on the RGB values of the first image.

$$Y1[x,y] = kr \cdot R1[x,y] + kg \cdot G1[x,y] + kb \cdot B1[x,y] \quad \text{(equation 1)}$$

kr, kg, kb in equation 1 are predetermined coefficients for calculating the luminance value Y1[x,y].

Figure 4:
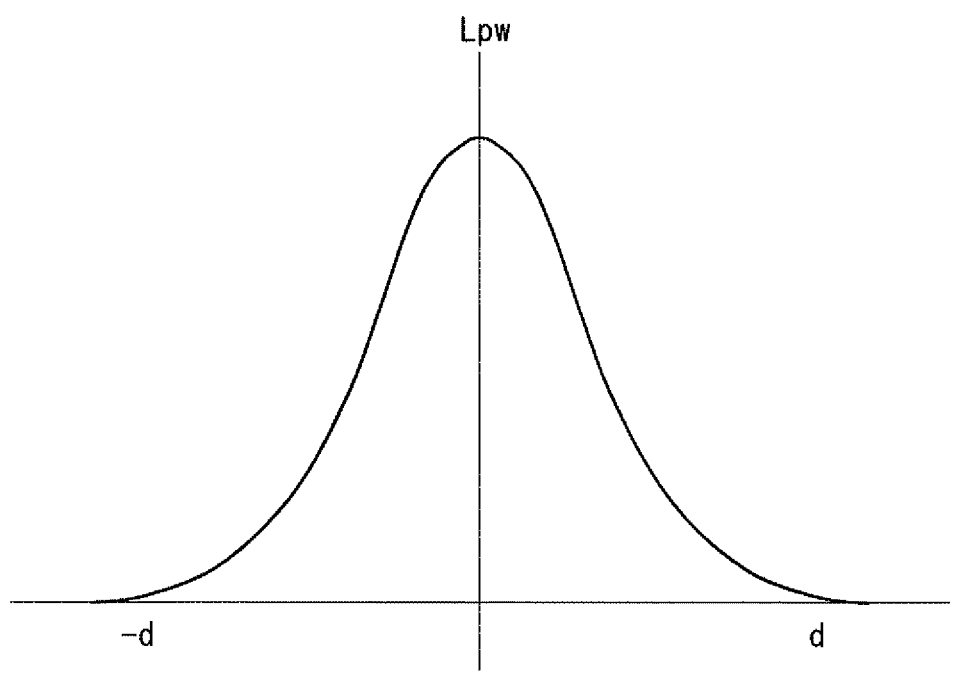
FIG. 4 is a diagram describing a low-pass filter.

Moreover, a filter Lpw illustrated in FIG. 4 with a relatively wide width d and the following equation are used to obtain a low-pass image LY1[x,y].

$$LY1[x, y] = \sum_{i=-d}^{d} \sum_{j=-d}^{d} \left( Y1[x+i, y+j] \cdot Lpw\left((i^2+j^2)^{1/2}\right) \right) \quad \text{(equation 2)}$$

In step S3, the image synthesizing unit 15 performs gradation conversion processing on the low-pass image LY1[x,y] by the gradation conversion processing unit 22. The gradation conversion processing unit 22 performs the gradation conversion processing using the following equation to obtain a low-pass image LY1t[x,y] after gradation processing.

$$LY1t[x,y] = Gm1(LY1[x,y]) \quad \text{(equation 3)}$$

Figure 5:
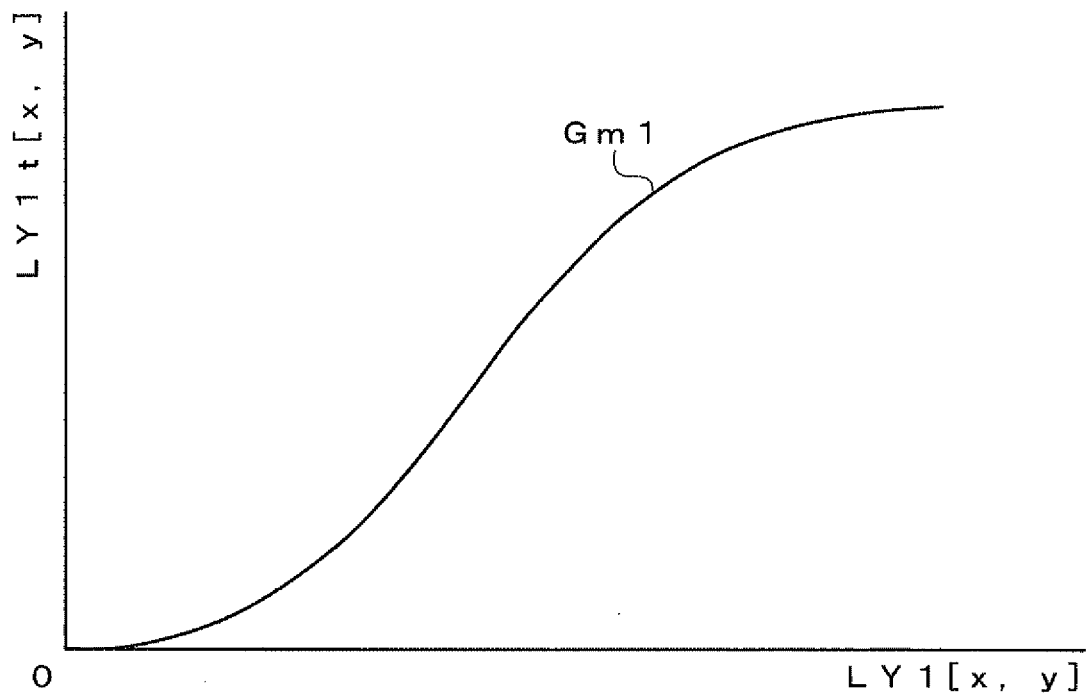
FIG. 5 is a diagram describing a gradation curve Gm1.

Gm1 in equation 3 is a gradation curve Gm1 illustrated in FIG. 5.

In step S4, the image synthesizing unit 15 performs synthetic processing by the synthesizing unit 23 to generate a synthetic image. The synthesizing unit 23 synthesizes the first image and the second image obtained in step S1 based on the low-pass image LY1t[x,y] subjected to the gradation conversion processing in step S3, so as to generate a synthetic image. The synthesizing of an image is performed for each of RGB values using the following equation 4 to equation 6.

$$Rmix[x,y] = (R1[x,y] \cdot LY1t[x,y] + R2[x,y] \cdot (255 - LY1t[x,y])) \div 255 \quad \text{(equation 4)}$$

$$Gmix[x,y] = (G1[x,y] \cdot LY1t[x,y] + G2[x,y] \cdot (255 - LY1t[x,y])) \div 255 \quad \text{(equation 5)}$$

$$Bmix[x,y] = (B1[x,y] \cdot LY1t[x,y] + B2[x,y] \cdot (255 - LY1t[x,y])) \div 255 \quad \text{(equation 6)}$$

In step S5, the image synthesizing unit 15 outputs the synthetic image made up of Rmix[x,y], Gmix[x,y], Bmix[x,y] calculated in step S4. In addition, the image synthesizing unit 15 may perform conversion processing on the RGB values of the synthetic image into YCbCr, and output the resultant image. Further, the synthetic image output from the image synthesizing unit 15 is compressed appropriately by the compression/extension unit 16 and recorded in the recording unit 17.

As described above, according to the first embodiment, N number of images (where N is an integer of 2 or larger) captured from the same photographing scene under mutually different exposure conditions are obtained, and low-pass processing is performed on at least one image out of the N number of images, to thereby create a low-pass image. Then a weighting amount in synthetic processing is decided based on the low-pass image, and the synthetic processing is performed on the N number of images according to the decided weighting amount, to thereby generate a synthetic image. Therefore, by calculating the weighting amount in synthesizing from the low-pass image, a dark part and a bright part in the first image and the second image can be roughly distinguished. Accordingly, decrease in contrast or chroma does not occur in an area where only the first image or the second image is reflected on the synthetic image. As a result, according to the first embodiment, a natural synthetic image with fewer changes in contrast, hue, and chroma can be generated by a simple configuration when generating a synthetic image with a higher dynamic range than the original image from a plurality of images captured from the same photographic scene under mutually different exposure conditions.

Although in the first embodiment the example of performing the gradation conversion processing using the gradation curve Gm1 illustrated in FIG. 5 is described, note that the present invention is not limited to this example.

Figure 6:
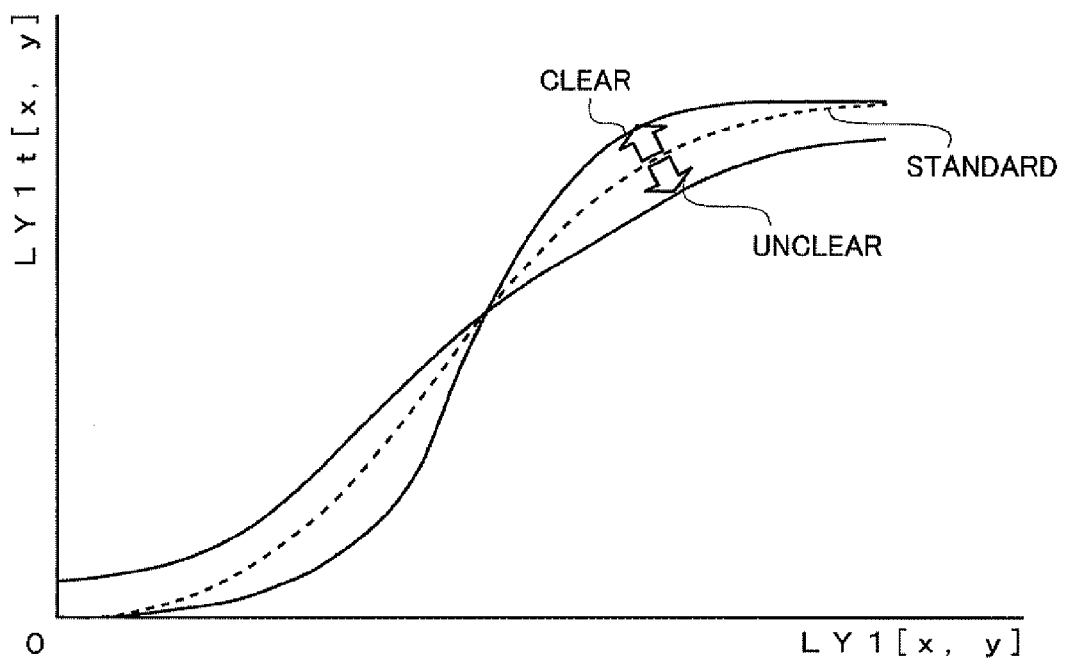
FIG. 6 is a diagram describing a change of the gradation curve.

For example, by changing a standard gradation curve (for example, the gradation curve Gm1 illustrated in FIG. 5) as illustrated in FIG. 6, the steepness of the boundary between two images (a first image and a second image) in a synthetic image can be changed. As illustrated in FIG. 6, when it is changed to a gently changing gradation curve, the above-described boundary becomes unclear, resulting in a soft synthetic image in which the boundary between the two images do not stand out. On the other hand, when it is changed to a sharply changing gradation curve, the above-described boundary becomes clear, resulting in a synthetic image in which the boundary between the two images are emphasized and stands out.

Figure 7:
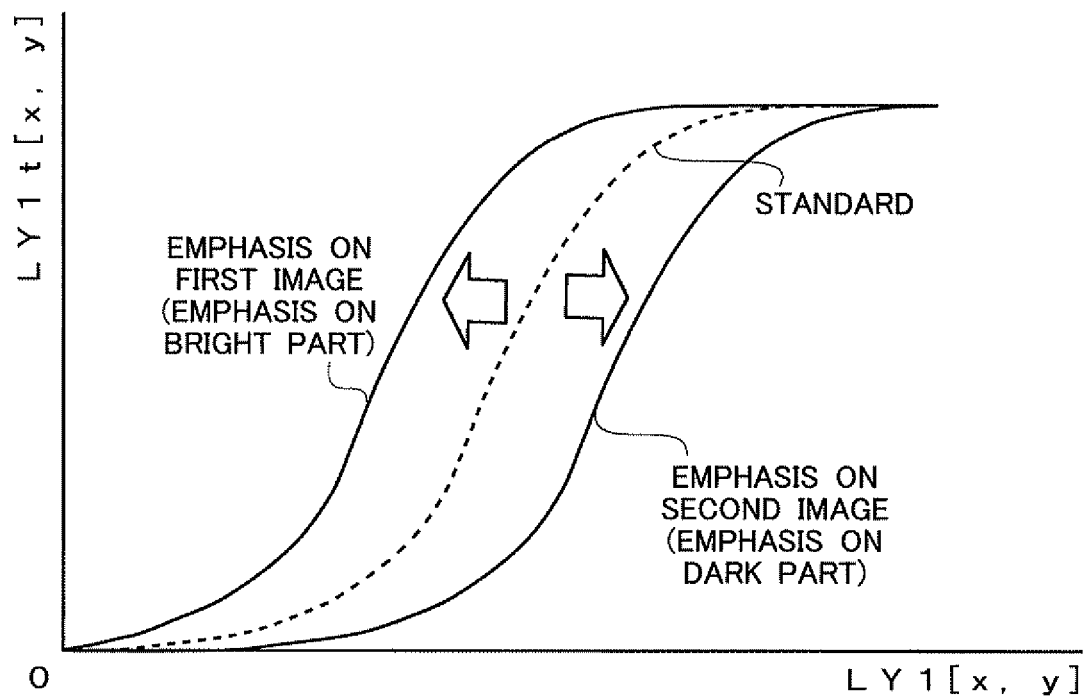
FIG. 7 is another diagram describing a change of the gradation curve.

Further, by changing a standard gradation curve (for example, the gradation curve Gm1 illustrated in FIG. 5) as illustrated in FIG. 7, the ratio of emphasis between two images (the first image and the second image) in a synthetic image can be changed. When a gradation curve with a change shifted to a dark part side as illustrated in FIG. 7 is employed, the above-described ratio becomes larger for the first image, and thereby a synthetic image emphasizing the first image is generated. In this case, in the synthetic processing, an area for selecting the first image with a less exposure amount increases, and consequently a synthetic image emphasizing a bright part and having less white saturation is generated. On the other hand, when a gradation curve with a change shifted to a bright part side is employed, the above-described ratio becomes larger for the second image, and thereby a synthetic image emphasizing the second image is generated. In this case, in the synthetic processing, an area for selecting the second image with a more exposure amount increases, and consequently a synthetic image emphasizing a dark part having fewer blocked up shadows is generated.

The image synthesizing unit may be configured to change the gradation curves described using FIG. 6 and FIG. 7 by a user operation via the operating unit, or may be configured to change the gradation curves based on a decision made by the controlling unit 18. When it is decided by the controlling unit 18, image analysis may be performed, and the gradation curves may be changed according to analysis results.

For example, dispersion of a histogram of the luminance value Y1[x,y] described in step S2 may be evaluated, and the gradation curve may be changed according to a spread of the histogram as illustrated in FIG. 6. In this case, for example, the boundary tends to stand out as the dispersion becomes smaller, and thus the gradation curve is changed so as to make the boundary "vaguer".

Further, a cumulative frequency distribution of the luminance value Y1[x,y] described in step S2 may be evaluated, and the gradation curve may be changed as described in FIG. 7 according to a cumulative frequency. In this case, for example, the gradation curve is changed using a luminance value with a cumulative frequency of ½ as a threshold.

[Second Embodiment]

Hereinafter, a second embodiment of the present invention will be described using drawings. The second embodiment is a modification example of the above-described first embodiment, and thus the description will be given only on parts different from the first embodiment. Further, components similar to those of the first embodiment are described using reference numerals similar to those of the first embodiment.

Figure 8:
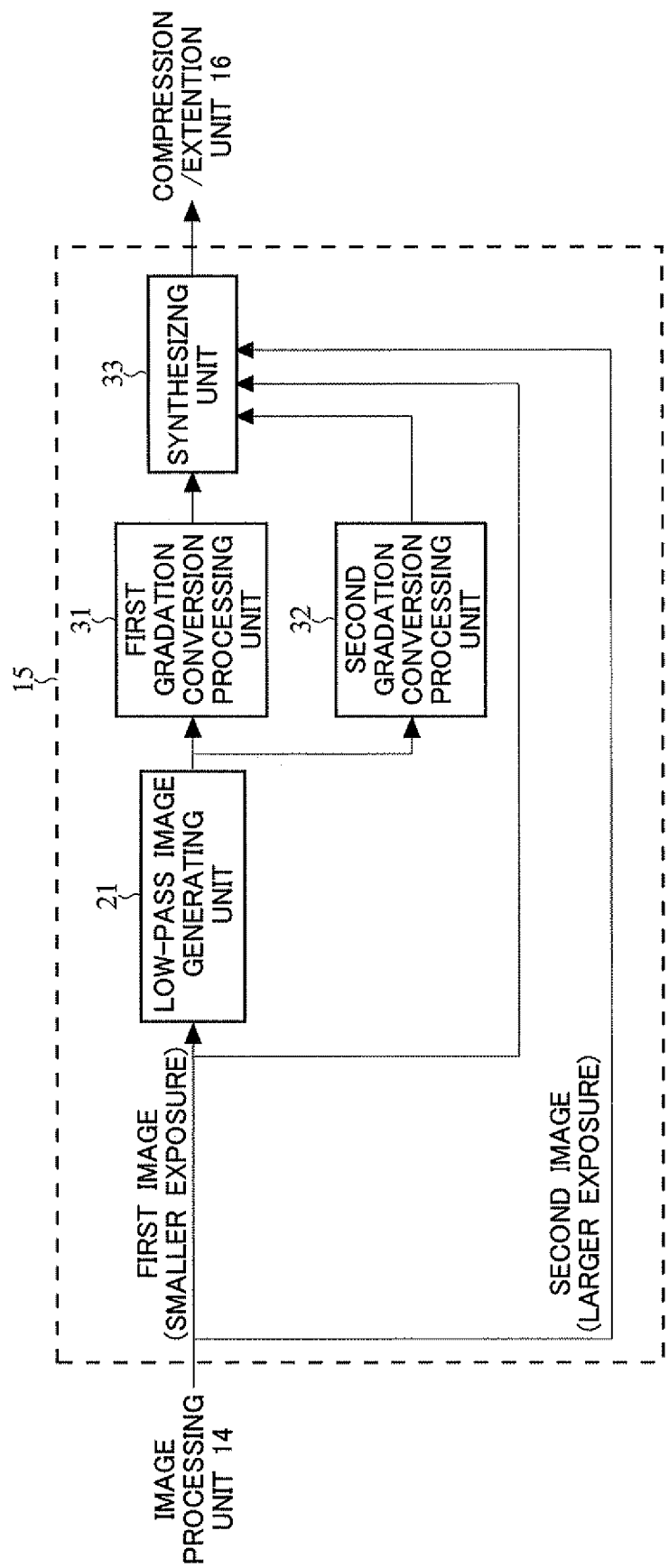
FIG. 8 is a diagram illustrating details of an image synthesizing unit 15 of a second embodiment.

FIG. 8 is a diagram illustrating details of the image synthesizing unit 15 of the second embodiment. The image synthesizing unit 15 of the second embodiment includes a first gradation conversion processing unit 31 and a second gradation conversion processing unit 32 instead of the gradation conversion processing unit 22 in the image synthesizing unit 15 of the first embodiment, and includes a synthesizing unit 33 instead of the synthesizing unit 23.

Figure 9:
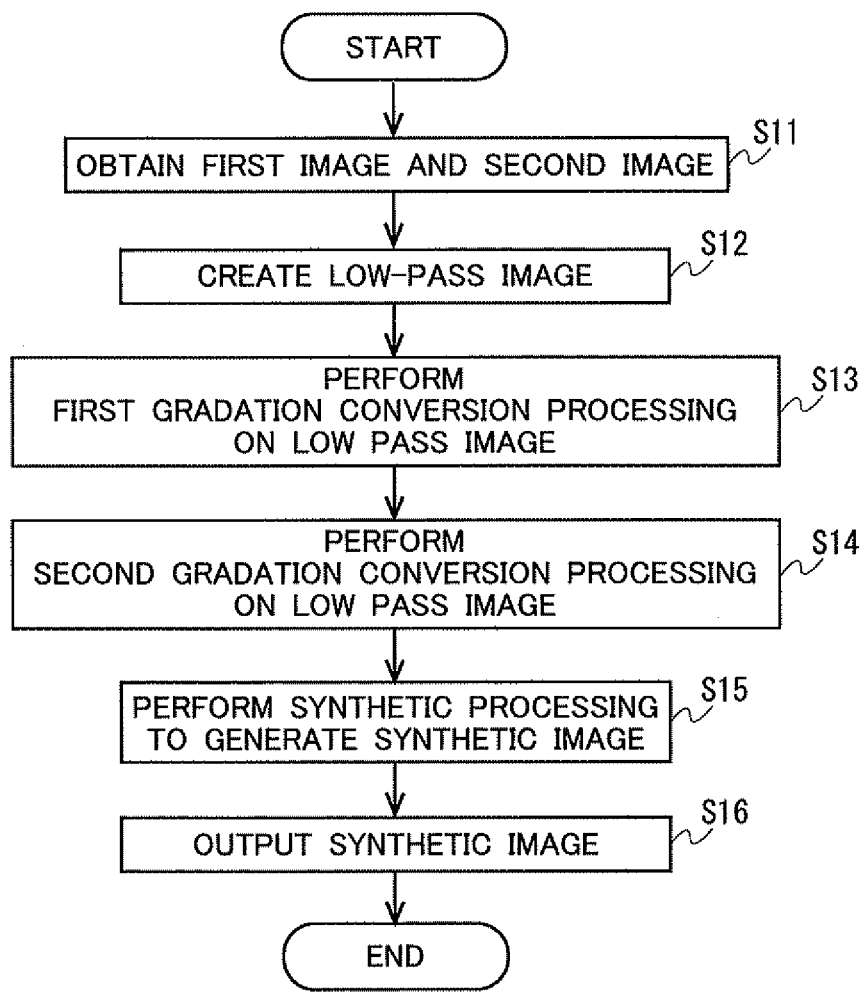
FIG. 9 is a flowchart illustrating operation of the image synthesizing unit 15 of the second embodiment.

Operation in the image synthesizing unit 15 described in FIG. 8 will be described using a flowchart of FIG. 9.

Figure 3:
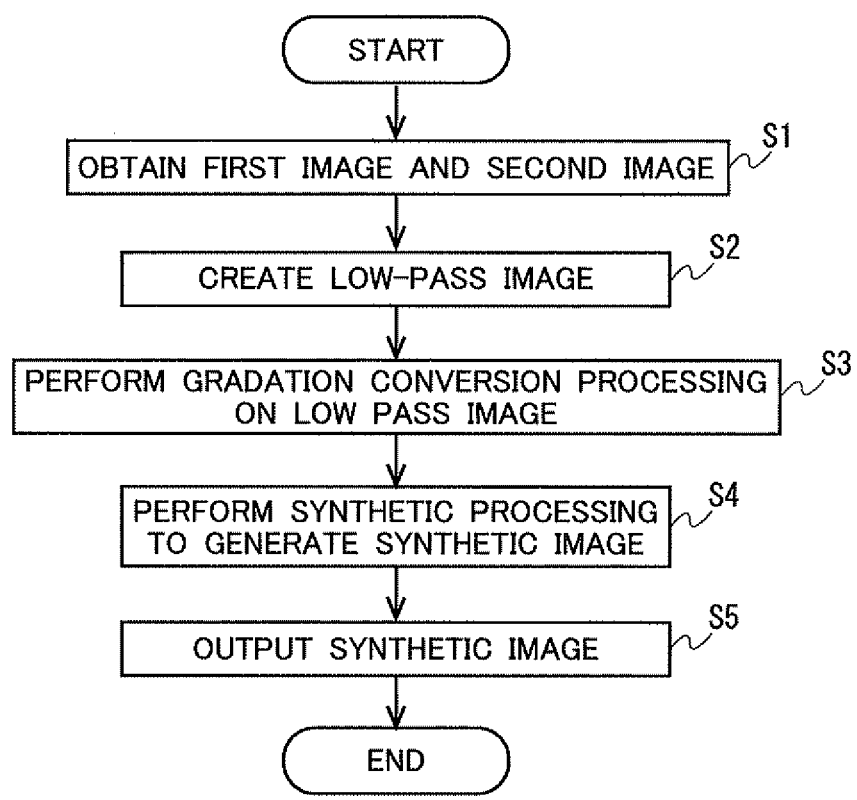
FIG. 3 is a flowchart illustrating operation of the image synthesizing unit 15 of the first embodiment.

In step S11 and step S12, the image synthesizing unit 15 performs processing similar to step S1 and step S2 of FIG. 3 of the first embodiment.

In step S13, the image synthesizing unit 15 performs first gradation conversion processing on the low-pass image LY1 [x,y] created in step S12 by the first gradation conversion processing unit 31. The first gradation conversion processing unit 31 performs the first gradation conversion processing using the following equation to obtain a low-pass image LY1t [x,y] after gradation processing.

$$LY1t[x,y]=Gm2(LY1[x,y])$$ (equation 7)

Figure 10:
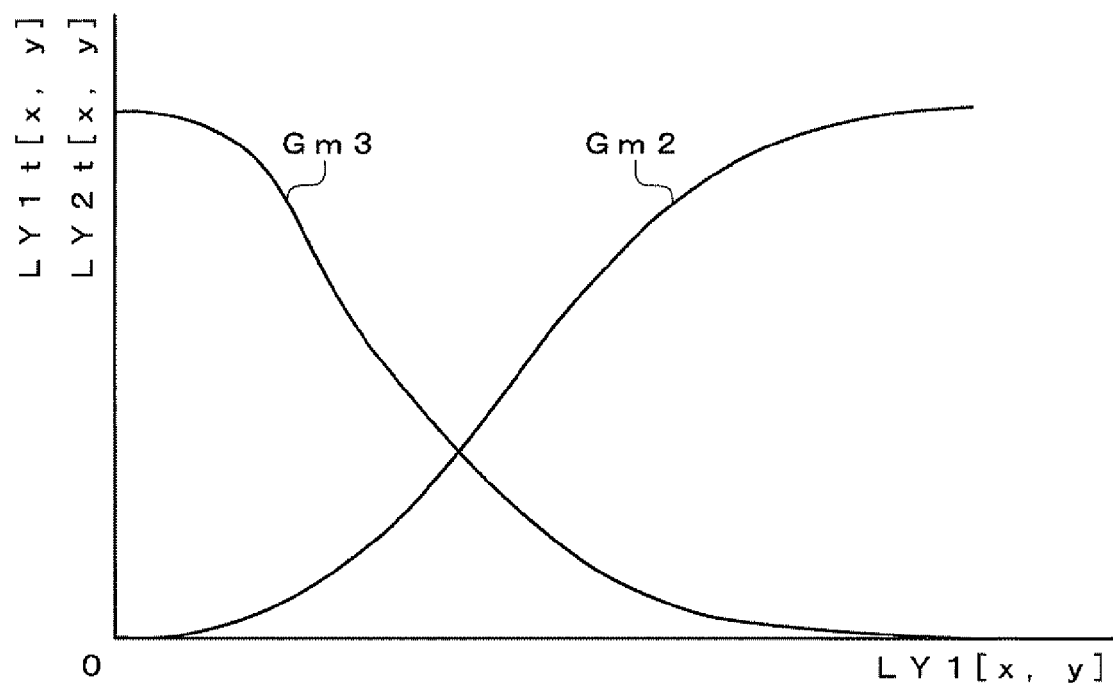
FIG. 10 is a diagram describing gradation curves Gm2, Gm3.

Gm2 in equation 7 is a gradation curve Gm2 illustrated in FIG. 10. Note that the gradation curve Gm2 may either be the same as or different from the gradation curve Gm1 illustrated in FIG. 5.

In step S14, the image synthesizing unit 15 performs second gradation conversion processing on the low-pass image LY1[x,y] created in step S12 by the second gradation conversion processing unit 32. The second gradation conversion processing unit 32 performs the second gradation conversion processing using the following equation to obtain a low-pass image LY2t[x,y] after gradation processing.

$$LY2t[x,y]=Gm3(LY1[x,y])$$ (equation 8)

Gm3 in equation 8 is a gradation curve Gm3 illustrated in FIG. 10.

In step S15, the image synthesizing unit 15 performs synthetic processing by the synthesizing unit 33 to generate a synthetic image. The synthesizing unit 33 synthesizes the first image and the second image obtained in step S11 based on the low-pass image LY1t[x,y] subjected to the first gradation conversion processing in step S13 and the low-pass image LY2t[x,y] subjected to the second gradation conversion processing in step S14, so as to generate a synthetic image. The synthesizing of an image is performed for each of RGB values using the following equation 9 to equation 11.

$$Rmix[x,y]=(R1[x,y]\cdot LY1t[x,y]+R2[x,y]\cdot LY2t[x,y])\div 255$$ (equation 9)

$$Gmix[x,y]=(G1[x,y]\cdot LY1t[x,y]+G2[x,y]\cdot LY2t[x,y])\div 255$$ (equation 10)

$$Bmix[x,y]=(B1[x,y]\cdot LY1t[x,y]+B2[x,y]\cdot LY2t[x,y])\div 255$$ (equation 11)

In step S16, the image synthesizing unit 15 outputs the synthetic image made up of Rmix[x,y], Gmix[x,y], Bmix[x,y] calculated in step S15. In addition, the image synthesizing unit 15 may perform conversion processing on the RGB values of the synthetic image into YCbCr, and output the resultant image. Further, the synthetic image output from the image synthesizing unit 15 is compressed appropriately by the compression/extension unit 16 and recorded in the recording unit 17.

As described above, according to the second embodiment, a gradation curve for a first image and a gradation curve for a second image are prepared, and low-pass images used during synthetic processing are created separately. Thus, it is possible to perform finer adjustment than the first embodiment with respect to the synthetic processing.

In addition, the respective processing described in the first embodiment or the second embodiment may be executed repeatedly to perform synthetic processing of three or more images captured under mutually different exposure conditions. For example, a first image, a second image, and a third image are obtained, and a synthetic image is created first from the first image and the second image through the processing described in the first embodiment. Then, with the synthetic image being a first image and the third image being a second image, the processing described in the first embodiment may be executed again, so as to perform synthetic processing of the three images. The same applies to the processing described in the second embodiment. Further, the same applies also to the synthetic processing of four or more images.

Moreover, the image synthesizing unit may be configured to perform synthetic processing of three or more images by appropriately combining the processing of the first embodiment and the processing of the second embodiment.

[Third Embodiment]

Hereinafter, a third embodiment of the present invention will be described using drawings. The third embodiment is a modification example of the above-described first embodiment, and thus the description will be given only on parts different from the first embodiment. Further, components similar to those of the first embodiment are described using reference numerals similar to those of the first embodiment.

Figure 11:
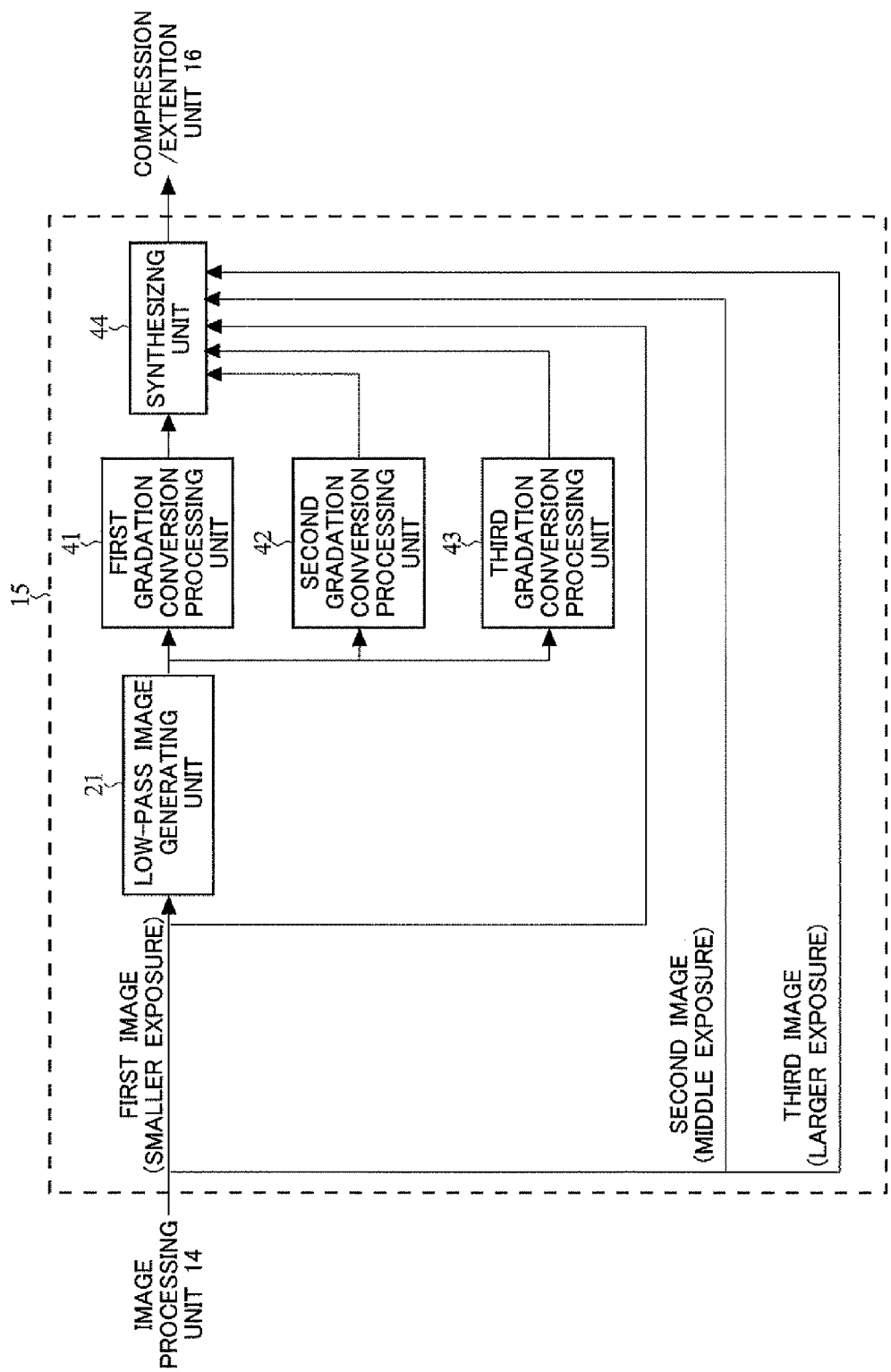
FIG. 11 is a diagram illustrating details of an image synthesizing unit 15 of a third embodiment.

FIG. 11 is a diagram illustrating details of the image synthesizing unit 15 of the third embodiment. The image synthesizing unit 15 of the third embodiment includes a first gradation conversion processing unit 41, a second gradation conversion processing unit 42, and a third gradation conversion processing unit 43 instead of the gradation conversion processing unit 22 in the image synthesizing unit 15 of the first embodiment, and includes a synthesizing unit 44 instead of the synthesizing unit 23.

Figure 12:
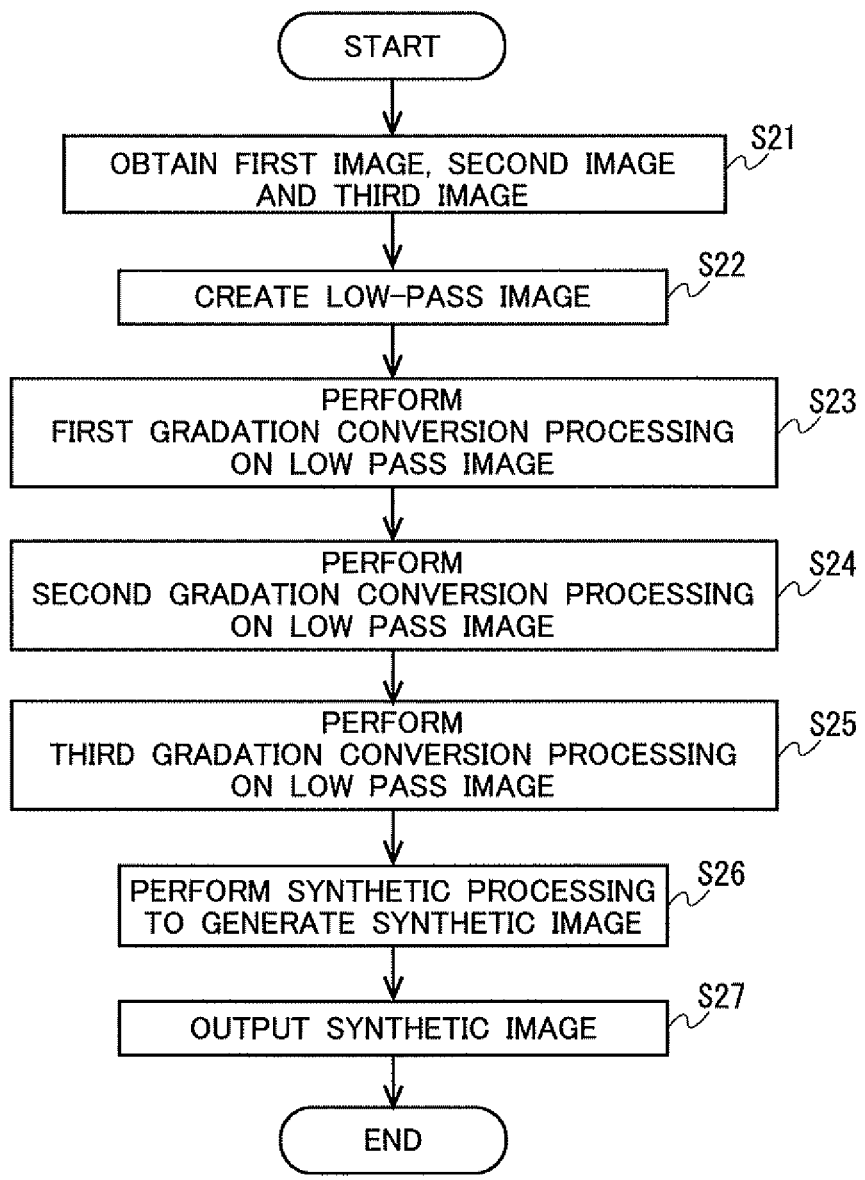
FIG. 12 is a flowchart illustrating operation of the image synthesizing unit 15 of the third embodiment.

Operation in the image synthesizing unit 15 described in FIG. 11 will be described using a flowchart of FIG. 12.

In step S21, the image synthesizing unit 15 obtains a first image, a second image, and a third image. The first image is an image having a less exposure amount than the second image, and the second image is an image having a less exposure amount than the third image. These first image, second image, and third image may be images after being subjected to ordinary image processing, or images in the course of ordinary image processing. Further, RGB values of the first image are denoted by $R1[x,y]$, $G1[x,y]$, $B1[x,y]$, RGB values of the second image are denoted by $R2[x,y]$, $G2[x,y]$, $B2[x,y]$, and RGB values of the third image are denoted by $R3[x,y]$, $G3[x,y]$, $B3[x,y]$.

In step S22, the image synthesizing unit 15 obtains a low-pass image $LY1[x,y]$ of the first image by the low-pass image generating unit 21, similarly to step S2 of the flowchart of FIG. 3.

In step S23, the image synthesizing unit 15 performs first gradation conversion processing on the low-pass image LY1[x,y] created in step S22 by the first gradation conversion processing unit 41. The first gradation conversion processing unit 41 performs the first gradation conversion processing using the following equation to obtain a low-pass image $LY1t[x,y]$ after gradation processing.

$$LY1t[x,y]=Gm4(LY1[x,y]) \qquad \text{(equation 12)}$$

Figure 13:
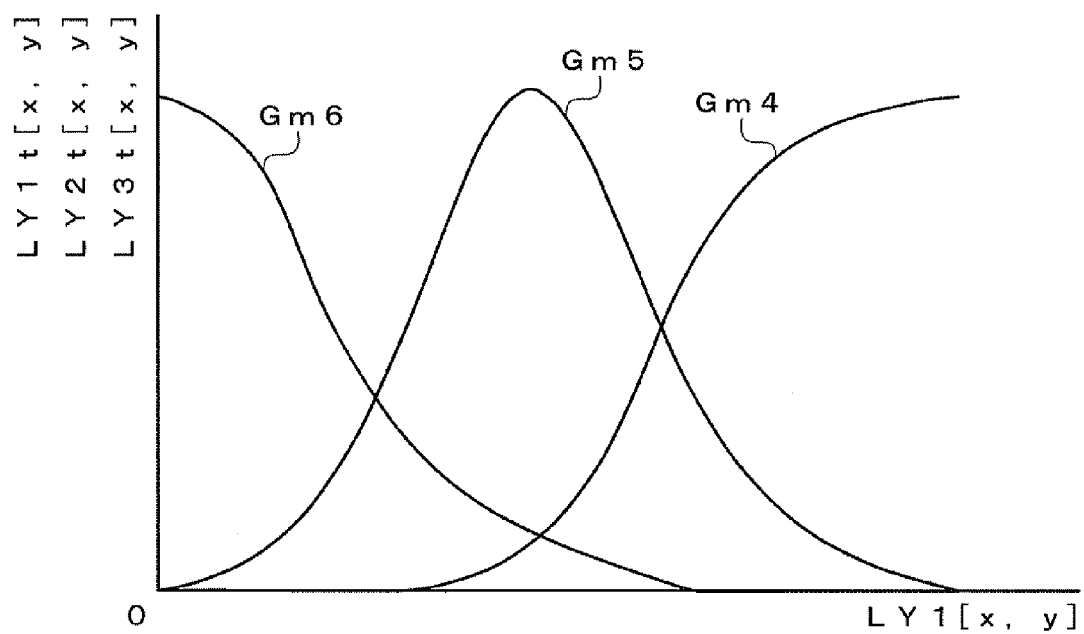
FIG. 13 is a diagram describing gradation curves Gm4, Gm5, Gm6.

Gm4 in equation 12 is a gradation curve Gm4 illustrated in FIG. 13. Note that the gradation curve Gm4 may either be the same as or different from the gradation curve Gm1 illustrated in FIG. 5.

In step S24, the image synthesizing unit 15 performs second gradation conversion processing on the low-pass image LY1[x,y] created in step S22 by the second gradation conversion processing unit 42. The second gradation conversion processing unit 42 performs the second gradation conversion processing using the following equation to obtain a low-pass image $LY2t[x,y]$ after gradation processing.

$$LY2t[x,y]=Gm5(LY1[x,y]) \qquad \text{(equation 13)}$$

Gm5 in equation 13 is a gradation curve Gm5 illustrated in FIG. 13.

In step S25, the image synthesizing unit 15 performs third gradation conversion processing on the low-pass image LY1[x,y] created in step S22 by the third gradation conversion processing unit 43. The third gradation conversion processing unit 43 performs the third gradation conversion processing using the following equation to obtain a low-pass image $LY3t[x,y]$ after gradation processing.

$$LY3t[x,y]=Gm6(LY1[x,y]) \qquad \text{(equation 14)}$$

Gm6 in equation 14 is a gradation curve Gm6 illustrated in FIG. 13. Note that the gradation curve Gm6 may either be the same as or different from the gradation curve Gm3 illustrated in FIG. 10.

In step S26, the image synthesizing unit 15 performs synthetic processing by the synthesizing unit 44 to generate a synthetic image. The synthesizing unit 44 synthesizes the first image, the second image, and the third image obtained in step S21 based on the low-pass image $LY1t[x,y]$ subjected to the first gradation conversion processing in step S23, the low-pass image $LY2t[x,y]$ subjected to the second gradation conversion processing in step S24, and the low-pass image $LY3t[x,y]$ subjected to the third gradation conversion processing in step S25, so as to generate a synthetic image. The synthesizing of an image is performed for each of RGB values using the following equation 15 to equation 17.

$$Rmix[x,y]=(R1[x,y] \cdot LY1t[x,y]+R2[x,y] \cdot LY2t[x,y])+R3[x,y] \cdot LY3t[x,y]) \div 255 \qquad \text{(equation 15)}$$

$$Gmix[x,y]=(G1[x,y] \cdot LY1t[x,y]+G2[x,y] \cdot LY2t[x,y])+G3[x,y] \cdot LY3t[x,y]) \div 255 \qquad \text{(equation 16)}$$

$$Bmix[x,y]=(B1[x,y] \cdot LY1t[x,y]+B2[x,y] \cdot LY2t[x,y])+B3[x,y] \cdot LY3t[x,y]) \div 255 \qquad \text{(equation 17)}$$

In step S27, the image synthesizing unit 15 outputs the synthetic image made up of Rmix[x,y], Gmix[x,y], Bmix[x,y] calculated in step S26. In addition, the image synthesizing unit 15 may perform conversion processing on the RGB values of the synthetic image into YCbCr, and output the resultant image. Further, the synthetic image output from the image synthesizing unit 15 is compressed appropriately by the compression/extension unit 16 and recorded in the recording unit 17.

Although the third embodiment has been described with respect to the example in which three images are synthesized, note that the synthesizing of four or more images can be handled by similarly increasing the gradation conversion processing units.

As described above, according to the third embodiment, when three or more images are synthesized, although the processing becomes more complicated in some degree, the processing can be performed faster than repeating the first embodiment and the second embodiment.

[Fourth Embodiment]

Hereinafter, a fourth embodiment of the present invention will be described using drawings. The fourth embodiment is a modification example of the above-described second embodiment, and thus the description will be given only on parts different from the second embodiment. Further, components similar to those of the second embodiment are described using reference numerals similar to those of the second embodiment.

Figure 14:
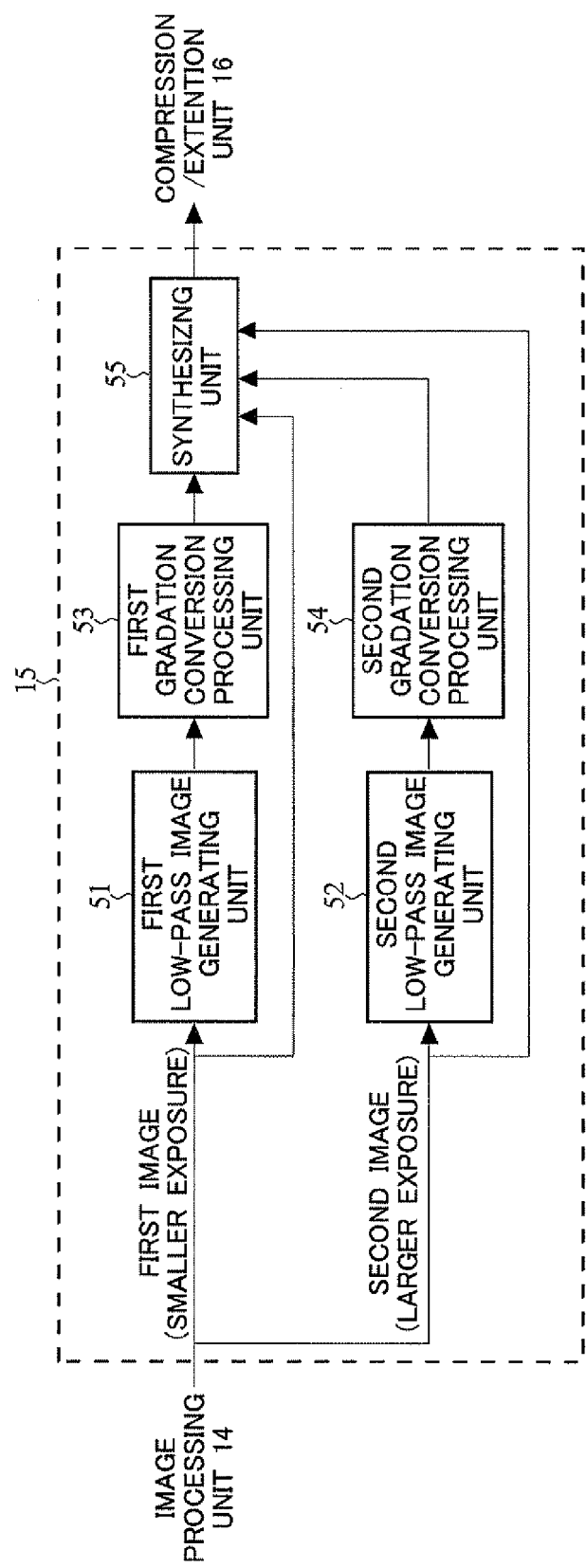
FIG. 14 is a diagram illustrating details of an image synthesizing unit 15 of a fourth embodiment.

FIG. 14 is a diagram illustrating details of the image synthesizing unit 15 of the fourth embodiment. The image synthesizing unit 15 of the fourth embodiment includes a first low-pass image generating unit 51 and a second low-pass image generating unit 52 instead of the low-pass image generating unit 21 in the image synthesizing unit 15 of the second embodiment, includes a first gradation conversion processing unit 53 and a second gradation conversion processing unit 54 instead of the first gradation conversion processing unit 31 and the second gradation conversion processing unit 32, and includes a synthesizing unit 55 instead of the synthesizing unit 33.

Figure 15:
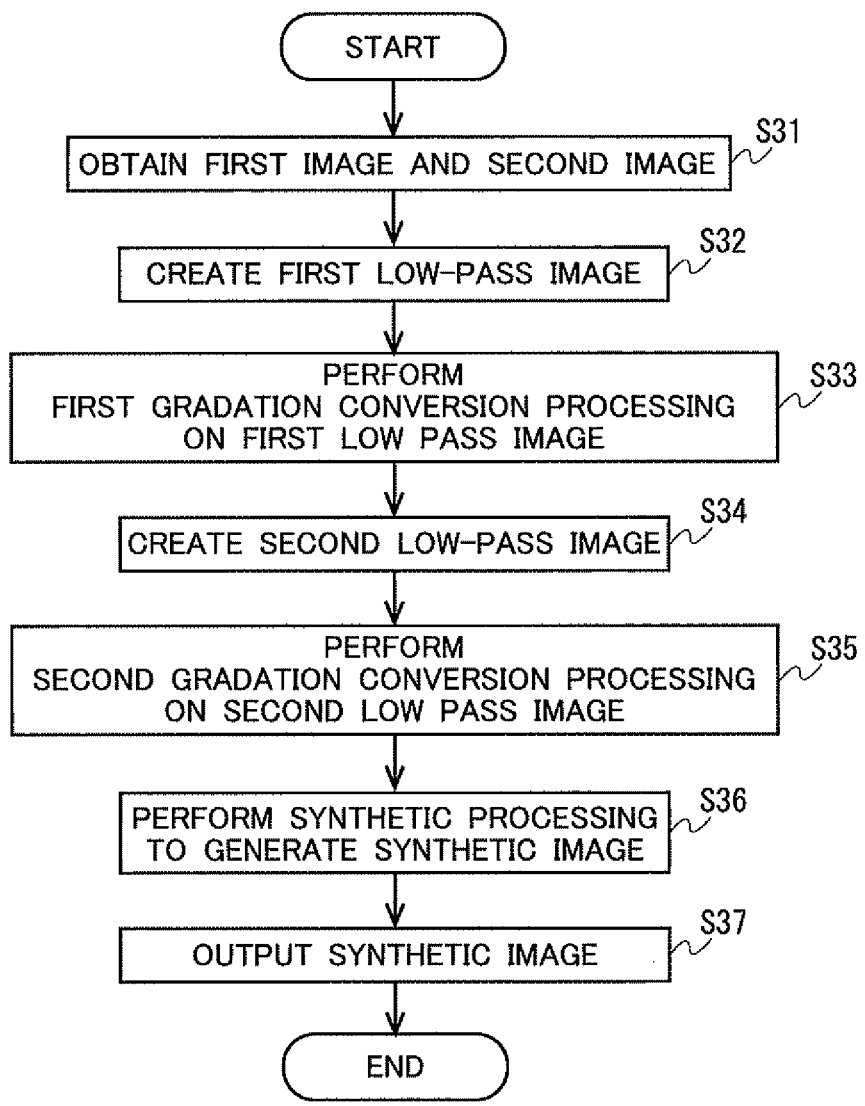
FIG. 15 is a flowchart illustrating operation of the image synthesizing unit 15 of the fourth embodiment.

Operation in the image synthesizing unit 15 described in FIG. 14 will be described using a flowchart of FIG. 15.

In step S31, the image synthesizing unit 15 obtains a first image and a second image. The first image and second image may be images after being subjected to ordinary image processing, or images in the course of ordinary image processing. Here, RGB values of the first image are denoted by R1[$x,y$], G1[$x,y$], B1[$x,y$], and RGB values of the second image are denoted by R2[$x,y$], G2[$x,y$], B2[$x,y$].

In step S32, the image synthesizing unit 15 creates a first low-pass image by the first low-pass image generating unit 51. The first low-pass image generating unit 51 performs processing similar to step S12 of the second embodiment to obtain a first low-pass image LY1[$x,y$] from the first image.

In step S33, the image synthesizing unit 15 performs first gradation conversion processing on the first low-pass image LY1[$x,y$] created in step S32 by the first gradation conversion processing unit 53. The first gradation conversion processing unit 53 performs processing similar to step S13 of the second embodiment to obtain a first low-pass image LY1$t$[$x,y$] after gradation processing.

In step S34, the image synthesizing unit 15 creates a second low-pass image by the second low-pass image generating unit 52. The second low-pass image generating unit 52 performs processing similar to step S12 of the second embodiment on the second image to obtain a second low-pass image LY2[$x,y$] from the second image.

In step S35, the image synthesizing unit 15 performs second gradation conversion processing on the second low-pass image LY2[$x,y$] created in step S34 by the second gradation conversion processing unit 54. The second gradation conversion processing unit 54 performs processing similar to step S14 of the second embodiment to obtain a second low-pass image LY2$t$[$x,y$] after gradation processing.

In step S36, the image synthesizing unit 15 performs synthetic processing by the synthesizing unit 55 to generate a synthetic image. The synthesizing unit 55 synthesizes the first image and the second image obtained in step S31 based on the low-pass image LY1$t$[$x,y$] subjected to the first gradation conversion processing in step S33 and the low-pass image LY2$t$[$x,y$] subjected to the second gradation conversion processing in step S35, so as to generate a synthetic image. The synthetic processing of the images is performed similarly to step S15 of the second embodiment.

In step S37, the image synthesizing unit 15 outputs the synthetic image made up of Rmix[x,y], Gmix[x,y], Bmix[x,y] calculated in step S36. In addition, the image synthesizing unit 15 may perform conversion processing on the RGB values of the synthetic image into YCbCr, and output the resultant image. Further, the synthetic image output from the image synthesizing unit 15 is compressed appropriately by the compression/extension unit 16 and recorded in the recording unit 17.

As described above, according to the fourth embodiment, although the processing becomes more complicated in some degree, finer adjustment than the second embodiment can be performed with respect to the synthetic processing.

In addition, the function of high dynamic range photographing described in the above-described embodiments may be executed by a user operation via the operating unit, or may be executed by a decision made by the controlling unit 18. When it is executed based on a decision made by the controlling unit 18, the decision may be made according to a photographing mode (for example, "portrait mode", "scenery mode", or the like), intensity of the contrast of an image, adjusting mode of an image, an image judgment result by scene analysis or face recognition, and/or the like.

Further, when auto white balance processing to set a white balance automatically is selected in the above-described embodiments, by setting individual white balances when the first image and the second image are generated, an image in which optimum white balance processing is performed for each of a bright part and a dark part can be generated.

Further, in each of the above-described embodiments, an example is described in which the techniques of the present invention are implemented in the electronic camera 10. However, the present invention is not limited to this. For example, the present invention can be applied similarly in a compact-type electronic camera, a movie camera taking a moving image, or the like.

Further, the image processing apparatus described in each of the above-described embodiments may be implemented by a computer and an image processing program in a software manner. In this case, the program may be configured to cause a computer to implement part or all of the processing of the image synthesizing unit 15 (processing of the flowcharts of FIG. 3, FIG. 9, FIG. 12, and FIG. 15). With such a configuration, it becomes possible to implement processing similar to those in the above-described embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus generating a synthesized image from (i) a first image obtained by image-capturing at a first exposure amount, and (ii) a second image obtained by image-capturing at a second exposure amount larger than the first exposure amount, wherein the image processing apparatus comprises:
a processor configured to:
perform a low-pass processing on the first image;
select a gradation curve for a gradation conversion processing, from among a plurality of gradation curves;
perform the gradation conversion processing on the first image on which the low-pass processing is performed according to the selected gradation curve; and
generate the synthesized image from the first image on which the low-pass processing has not been performed and the second image by using the first image on which the low-pass processing and the gradation conversion processing has been performed.

2. The image processing apparatus as set forth in claim 1, wherein the processor is further configured to calculate a weighting amount, from the first image on which the low-pass processing is performed, that is used when the first and second images are synthesized.

3. The image processing apparatus as set forth in claim 1, wherein the processor is further configured to select the gradation curve used for the gradation conversion processing from among (i) a first gradation curve having a first gradation conversion characteristic, (ii) a second gradation curve having a second gradation conversion characteristic that makes a boundary between the first and second images of the synthesized image more clear than the first gradation curve, and (iii) a third gradation curve having a third gradation conversion characteristic that makes a boundary between the first image on which the low-pass processing has not been performed and the second image of the synthesized image more vague than the first gradation curve.

4. The image processing apparatus as set forth in claim 1, wherein the processor is further configured to select the gradation curve used for the gradation conversion processing from among (i) a first gradation curve having a first gradation conversion characteristic, (ii) a second gradation curve having a second gradation conversion characteristic that is shifted more to a dark side of gradation than the first gradation curve, and (iii) a third gradation curve having a third gradation conversion characteristic that is shifted more to a bright side of gradation than the first gradation curve.

5. The image processing apparatus as set forth in claim 1, wherein the processor is further configured to select the gradation curve used for the gradation conversion processing according to an operation by a user.

6. An image-capturing apparatus generating a synthesized image from (i) a first image obtained by image-capturing at a first exposure amount, and (ii) a second image obtained by image-capturing at a second exposure amount larger than the first exposure amount, wherein the image-capturing apparatus comprises:
an image-capturing sensor; and
a processor configured to:
perform a low-pass processing on the first image;
select a gradation curve used for a gradation conversion processing from among a plurality of gradation curves;
perform the gradation conversion processing on the first image on which the low-pass processing is performed according to the selected gradation curve; and
generate the synthesized image from the first image on which the low-pass processing has not been performed and the second image by using the first image on which the low-pass processing and the gradation conversion processing has been performed.

7. The image-capturing apparatus as set forth in claim 6, wherein the processor is further configured to calculate a weighting amount, from the first image on which the low-pass processing is performed by the low-pass processing unit, that is used when the first and second images are synthesized.

8. The image-capturing apparatus as set forth in claim 6, wherein the processor is further configured to select the gradation curve used for the gradation conversion processing from among: (i) a first gradation curve having a first gradation conversion characteristic, (ii) a second gradation curve having a second gradation conversion characteristic that makes a boundary between the first and second images of the synthesized image more clear than the first gradation curve, and (iii) a third gradation curve having a third gradation conversion characteristic that makes a boundary between the first image on which the low-pass processing has not been performed and the second image of the synthesized image more vague than the first gradation curve.

9. The image-capturing apparatus as set forth in claim 6, wherein the processor is further configured to select the gradation curve used for the gradation conversion processing from among: (i) a first gradation curve having a first gradation conversion characteristic, (ii) a second gradation curve having a second gradation conversion characteristic that is shifted more to a dark side of gradation than the first gradation curve, and (iii) a third gradation curve having a third gradation conversion characteristic that is shifted more to a bright side of gradation than the first gradation curve.

10. The image-capturing apparatus as set forth in claim 6, wherein the processor is further configured to select the gradation curve used for the gradation conversion processing according to an operation by a user.

* * * * *